(12) United States Patent
Baur et al.

(10) Patent No.: US 7,597,171 B2
(45) Date of Patent: Oct. 6, 2009

(54) DEVICE FOR TRIGGERING PASSIVE PASSENGER SAFETY MEASURES

(75) Inventors: Richard Baur, Pfaffenhofen (DE); Jan Urbahn, Ramsey, NJ (US); Willibald Watzka, Aichach (DE); Mario Nagelstrasser, Wettstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/797,202

(22) Filed: May 1, 2007

(65) Prior Publication Data

US 2007/0227799 A1 Oct. 4, 2007

Related U.S. Application Data

(63) Continuation of application No. PCT/EP2005/010039, filed on Sep. 17, 2005.

(30) Foreign Application Priority Data

Nov. 5, 2004 (DE) ........................ 10 2004 053 431

(51) Int. Cl.
*B60R 21/00* (2006.01)
(52) U.S. Cl. ........................ 180/282; 180/274; 340/669; 293/117
(58) Field of Classification Search ................. 180/271, 180/274, 282; 280/734, 735; 701/45; 340/669; 293/117
See application file for complete search history.

(56) References Cited

U.S. PATENT DOCUMENTS

| | | | |
|---|---|---|---|
| 3,861,488 A | 1/1975 | Hamada et al. | |
| 4,995,639 A | 2/1991 | Breed | |
| 6,516,278 B1 | 2/2003 | Ishizaki et al. | |
| 6,530,597 B1 | 3/2003 | Nesper et al. | |

(Continued)

FOREIGN PATENT DOCUMENTS

DE 44 18 681 A1 11/1995

(Continued)

OTHER PUBLICATIONS

International Search Report dated Jan. 27, 2008 with English translation of the pertinent portion (Four (4) pages).

(Continued)

*Primary Examiner*—Paul N. Dickson
*Assistant Examiner*—Drew J. Brown
(74) *Attorney, Agent, or Firm*—Crowell & Moring LLP

(57) ABSTRACT

A system for triggering passive occupant safety measures in a motor vehicle is described. The system includes a control unit, a plurality of acceleration sensors for detecting the acceleration caused by an impact of the motor vehicle as well as feed lines assigned to the acceleration sensors, by which feed lines the output signals of the acceleration sensors are transmitted to the control unit which analyzes the signals to determine the type and/or severity of the impact, and triggers appropriate safety measures. The sensors are mounted on a vehicle part of a low structural stiffness on the outer vehicle circumferences, and all surrounding vehicle parts of high stiffness are designed to prevent contact with the sensors after an impact of the motor vehicle of a low or medium severity within a minimum reaction time period.

20 Claims, 2 Drawing Sheets

U.S. PATENT DOCUMENTS

| | | |
|---|---|---|
| 6,600,412 B2 | 7/2003 | Ishizaki et al. |
| 6,637,788 B1 * | 10/2003 | Zollner et al. ............... 293/107 |
| 6,728,613 B2 * | 4/2004 | Ishizaki et al. ................ 701/36 |
| 6,792,678 B2 * | 9/2004 | Yamada et al. ................ 29/857 |
| 7,024,293 B2 * | 4/2006 | Ishizaki et al. ................ 701/45 |
| 7,137,472 B2 * | 11/2006 | Aoki .......................... 180/274 |
| 2004/0186643 A1 | 9/2004 | Tanaka et al. |
| 2005/0012312 A1 * | 1/2005 | Roelleke .................... 280/735 |
| 2005/0096815 A1 * | 5/2005 | Takafuji et al. ............... 701/45 |
| 2006/0064220 A1 * | 3/2006 | Murakami et al. ............ 701/45 |
| 2006/0162982 A1 * | 7/2006 | Lich .......................... 180/271 |
| 2006/0219461 A1 * | 10/2006 | Kiribayashi ................. 180/274 |
| 2006/0244245 A1 * | 11/2006 | Nonaka et al. .............. 280/735 |
| 2006/0265130 A1 | 11/2006 | Mattes et al. |
| 2006/0272391 A1 * | 12/2006 | Tsukamoto et al. ........ 73/12.09 |
| 2006/0278461 A1 * | 12/2006 | Shen et al. .................. 180/274 |

FOREIGN PATENT DOCUMENTS

| | | |
|---|---|---|
| DE | 197 40 021 A1 | 3/1999 |
| DE | 199 09 296 A1 | 9/2000 |
| DE | 100 45 698 A1 | 5/2001 |
| DE | 101 45 698 A1 | 5/2002 |
| DE | 101 42 925 C1 | 11/2002 |
| DE | 101 53 015 A1 | 5/2003 |
| DE | 102 06 351 A1 | 9/2003 |
| DE | 10 2004 012 852 A1 | 9/2004 |
| DE | 103 07 745 A1 | 9/2004 |

OTHER PUBLICATIONS

German Search Report dated May 19, 2005 with an English translation of the pertinent portion (Eight (8) pages).

Form PCT/ISA/237, Form PCT/IB/373, PCT/IB/338 all dated Jan. 2004 (Seven (7) pages).

* cited by examiner

DEVICE FOR TRIGGERING PASSIVE PASSENGER SAFETY MEASURES

CROSS REFERENCE TO RELATED APPLICATIONS

This application is a continuation of PCT International Application No. PCT/EP2005/010039, filed Sep. 17, 2005, which claims priority under 35 U.S.C. § 119 to German Patent Application No. 10 2004 053 431.4 filed Nov. 5, 2004, the entire disclosures of which are herein expressly incorporated by reference.

BACKGROUND AND SUMMARY OF THE INVENTION

The invention relates to a system for triggering passive occupant safety measures in a motor vehicle, having a control unit, a plurality of acceleration sensors for detecting the acceleration caused by an impact of the motor vehicle at different locations of the motor vehicle as well as feed lines assigned to the acceleration sensors, by which feed lines the output signals of the acceleration sensors are transmitted to the control unit which analyzes value-continuous output signals at least of some of the acceleration sensors, determines the type and/or severity of the impact from the output signals and, as a function thereof, triggers appropriate safety measures.

Passive safety measures for the protection of the occupants of a motor vehicle are triggered on the basis of signals which are typically obtained from sensors mounted in a distributed manner in the vehicle. With a view to the timely triggering of such safety measures adequate for any situation, the appropriate spatial mounting of the sensors and their reliability are extremely important.

For being able to judge, in addition to the occurrence of an impact, also its type and severity, it is advantageous to detect the time behavior of the acceleration acting upon different parts of the vehicle. For this purpose, acceleration sensors are frequently used in passive occupant safety devices. These are typically suitable for supplying a value-continuous signal as the output signal which is proportional to the active acceleration. Likewise, there are sensors in the case of which an acceleration signal is already integrated in the sensor, and a speed signal or position signal is thereby emitted. In the following, such sensors will also be called acceleration sensors.

In addition to acceleration sensors in the above-mentioned sense, sensors are frequently used which change their output signal only when the acceleration, speed or deformation acting upon them exceeds a certain threshold. In the following, such sensors will be called binary sensors. Sensors which supply a value-continuous signal will also be called binary sensors in the following. However, this value-continuous signal will only be analyzed in a threshold-based manner for obtaining a binary signal by a control unit to which the signal is transmitted.

For the rapid detection of an impact, particularly of a frontal impact, numerous systems are known in which so-called front sensors are mounted close to the outer vehicle circumferences. From U.S. Patent Document U.S. Pat. No. 3,861,488, a sensor for the detection of an impact speed is known, which is mounted directly on the side of a bumper facing the vehicle interior. However, no devices for differentiating between a safety-relevant impact of the vehicle and non-safety-relevant disturbing influences are provided in the described safety system. The high probability of a faulty triggering connected therewith should be considered to be a serious disadvantage of a passive safety device. Furthermore, the used sensor and its feed line in the described embodiment, which is characterized by a particularly exposed mounting site, are insufficiently protected from environmental influences (weather, splashing water, etc.), which may have a disadvantageous effect on the durability of these components and may lead to a malfunction.

The most frequent mounting site of front sensors according to the state of the art is a vehicle body part close to the outer vehicle circumferences defined by the bumpers of the vehicle. For example, a passive safety device is known from U.S. Patent Document U.S. Pat. No. 4,995,639, in which a front sensor is mounted on a forward cross member of the vehicle. With respect to the measurability and analyzability of the sensor signals, this type of mounting has the disadvantage that, because of the stiffness of the vehicle body, which is high in comparison to the bumpers, very high acceleration peaks act upon the acceleration sensor within a relatively short period of time in the case of an impact. The high stiffness of the vehicle body may also increase the occurrence of mechanical resonance vibrations which are superimposed on the acceleration signal to be measured and make its analysis difficult. In addition, in the case of a mounting of an acceleration sensor displaced from the outer vehicle circumferences to the vehicle interior—FIG. 1 of U.S. Patent Document U.S. Pat. No. 4,995,639 does not show all relevant vehicle parts—, only an indirect mechanical coupling exists between the point of impact and the mounting site of the acceleration sensor. The mechanical transmission of the impact energy by way of this indirect mechanical coupling causes a falsification of the acceleration measured by the acceleration sensor in comparison with the acceleration acting at the outer vehicle circumferences. As a result, an impact can be detected only very late and can be judged only imprecisely with respect to its type and severity. This applies particularly to an impact of low or medium intensity. As demonstrated by investigations, a more severe impact can be better detected by sensors mounted at other measuring sites.

In the following, an impact of low or medium severity is defined as an impact at a relative impact velocity of up to 40 km/h against a soft object or at a relative impact velocity of up to 30 km/h against a hard object.

A passive safety system having front sensors mounted directly on the forward bumpers is known from German Patent Document DE 101 42 925 C1. However, in this case, the front sensors are constructed as binary sensors which are used only for the early detection of an impact. The assessment of the type and severity of an impact takes place on the basis of acceleration sensors arranged farther in the vehicle interior. The disadvantages with respect to the detection and assessment of an impact of low or medium severity, which accompany the indirect mechanical coupling between the impact site and the sensor mounting site resulting from the mounting in the vehicle interior, were explained above The present invention provides a system for triggering passive safety measures which has a low risk of malfunctioning and permits an early impact detection and a precise assessment of the type and/or severity of an impact. In particular, an early detection and a precise assessment should take place with respect to an impact of low or medium severity.

This is achieved by using a passive safety system in which the acceleration sensors provided for receiving signals are mounted on vehicle parts of low structural stiffness on the outer vehicle circumferences. These vehicle parts are constructed with respect to shape, arrangement and material such that, after an impact of low or medium severity of the motor vehicle, the acceleration sensors will not come in contact with vehicle parts of high structural stiffness within a minimum reaction time period.

In the event of an impact of the vehicle upon an object, the highest acceleration values act upon those vehicle parts which are situated closest to the impact site on the outer vehicle circumferences. Likewise, for such vehicle parts, the maximum amount over time of the acceleration following an impact is reached at a very early point in time. This applies particularly when the above-mentioned vehicle parts have a low structural stiffness, and thus react to the impact with a high deformation and therefore high acceleration values. If an acceleration sensor is mounted on such a vehicle part, an impact close to the mounting site of the acceleration sensor causes a very early and considerable change of the output signal of the acceleration sensor.

The direct mechanical coupling between an impacting object and a vehicle part on the outer vehicle circumferences close to the impact site results in a direct mechanical coupling between the impacting object and an acceleration sensor mounted on the vehicle part. The acceleration acting upon the impact site therefore acts in a genuine manner or in a less falsified manner upon the acceleration sensor than in the case of the mounting of the acceleration sensor at a different site of the vehicle. The time behaviors of the acceleration which can be received by an acceleration sensor mounted according to the invention, with respect to the signal quality and value range, are therefore typically suitable for a value-continuous analysis.

The early providing of mechanically genuine, value-continuously analyzable acceleration time behaviors taking place by a system according to the invention, in the case of a corresponding signal transmission and analysis, permits a precise and reliable assessment of the type and severity of an impact, and thus promotes the triggering of adequate passive safety measures. The safety of the vehicle occupants is thereby greatly improved.

The mounting of an acceleration sensor on a vehicle part of a low structural stiffness has the advantage that, in contrast to the mounting on a vehicle body part, the effect of vibrations not relevant to safety upon the acceleration sensor is reduced.

Another significant advantage of a system according to the invention is the fact that the acceleration acting upon the acceleration sensor during an impact lasts for a longer period of time in contrast to a mounting on a vehicle body part. As a result of the longer reaction time, a time behavior signal can be obtained which can be analyzed better and can be used, for example, in a control unit for a comparison with patterns filed there in a database. In this case, a minimum length of the reaction time period of, for example, approximately 40 ms, which in the following will be called a minimum reaction time, is desirable. The precise minimum reaction time depends on the method used for assessing the impact.

However, a minimum reaction time can only be guaranteed if, even in the event of a deformation of the vehicle resulting from an impact, the acceleration sensor is not destroyed within the minimum reaction time period or fails for other reasons. A minimum reaction time period is the time period of the length of the minimum reaction time which starts at the moment of the impact between the vehicle and the object.

In order to prevent the destruction of the acceleration sensors within the minimum reaction time period, in a system according to the invention, the acceleration sensors are mounted such that, and all vehicle parts are constructed with shapes arrangements and materials such that contained acceleration sensors, after an impact and within the minimum reaction time period, do not come in contact with vehicle parts of a high structural stiffness.

According to a further exemplary embodiment of the invention, a deformation space is provided for this purpose on the side of the acceleration sensor facing the vehicle interior, which deformation space is either hollow or is filled exclusively with vehicle parts of a low structural stiffness. Toward the vehicle exterior, the deformation space is preferably bounded by a plane extending through the acceleration sensor, whose normal line points from the acceleration sensor to the vehicle interior. The shape of the deformation space toward the vehicle interior is defined by the shape and arrangement of the adjacent vehicle parts. Deformations of these vehicle parts cannot change the deformation space.

Instead of a plane through the acceleration sensor, a hyperplane, for example, conically starting out from the acceleration sensor can also be defined as a more restrictive boundary of the deformation space toward the vehicle exterior. In this manner, possible deformation-caused movement directions of the acceleration sensor can be taken into account. According to the invention, the plane or hyperplane is selected such that the acceleration sensor is always, particularly in the case of an impact, situated completely on the vehicle interior side of the plane or hyperplane.

If such a deformation space already exists on a vehicle part on the side, which faces the vehicle interior, of a site in principle suitable for the mounting of an acceleration sensor according to the invention, an acceleration sensor may be mounted on this site.

Depending on the point of view, the acceleration sensor itself may be situated within the deformation space or on the edge of the deformation space assigned to it, which edge points to the vehicle exterior. In the event of an impact, the acceleration sensor is displaced farther into the interior of the deformation space as a result of the deformation of the motor vehicle part to which it is fastened. Because of the fact that no vehicle parts of a high structural stiffness are situated in the deformation space, it is ensured that the acceleration sensor is not destroyed as a result of the contact with a vehicle part of a high structural stiffness, as long as it is situated completely in the interior of the deformation space.

The dimensions of the deformation space to be provided, particularly its depth toward the vehicle interior, are defined by the range of the impact velocities to be detected by the acceleration sensor, and by the minimum reaction time and the structural stiffness of the vehicle part on which the acceleration sensors is mounted. If information is available in this respect, the mass, the shape, the stiffness, the speed and additional physical quantities of impacting objects can also be taken into account during the assessment. In principle, the dimensioning of the deformation space can take place on the basis of limit value estimates and/or computations and/or simulations, such as FEM.

Because of advanced development and manufacturing methods, the deformation space can already be taken into account in the early development process of a vehicle and, as a rule, can be implemented in the manufacturing process with the lowest possible increase of manufacturing expenditures. Whether a certain dimensioning guarantees a desired minimum reaction time in the event of an impact of a predefined type or severity or permits a highly probable expectation, can be verified during the development process, for example, by simulations on data models, particularly virtual prototypes.

In addition to the avoidance of the mechanical destruction of the acceleration sensors themselves, the availability of suitable output signals of the acceleration sensors for the analysis in the control unit also depends on whether the mechanical destruction of the feed lines of the acceleration sensors can be prevented in the event of an impact.

For reasons of simplicity, it is assumed in the following that each acceleration sensor has a single feed line which connects it directly with the control unit. However, the carried-out considerations can easily also be applied to the indirect linking of the acceleration sensors to the control unit by way of other components of a data bus system and/or a mutual networking of the acceleration sensors. Such embodiments are therefore also within the scope of the invention. Likewise, by using the control unit, which may consist of one or several components, additional sensors can be analyzed for the same or a different purpose. Depending on the type of acceleration sensor, as required, the feed line may supply the acceleration sensor with a supply, offset or reference quantity needed for its operation.

According to a second exemplary embodiment of the invention, the feed line of the at least one acceleration sensor has an elastic, preferably flexible construction and extends inside a feed line duct defined by the shape, arrangement and possibly deformation of the adjacent vehicle parts. The mechanical destruction of the feed line can then be excluded with a high probability if, in the event of an impact, this feed line duct is not interrupted at any point by the deformation of vehicle parts and if, as a result of the deformation, the length of the feed line duct does not change such that the length of the feed line is no longer sufficient for extending through the entire feed line duct. According to the above-mentioned second exemplary embodiment of the invention, the shape, arrangement and material of all vehicle parts are therefore designed such that, within a minimum reaction time period after an impact of the motor vehicle of low or medium severity, the smallest diameter of the feed line duct remains larger than the diameter of the feed line.

A first requirement is that the cross-section of the feed line is substantially constant and circular along the length of the feed line. In the case of a feed line having a cross-section that is not constant and/or not circular, correspondingly higher expenditures have to be considered for the remaining feed line duct. Such a consideration and the construction of the vehicle parts forming the feed line duct derived therefrom are also within the scope of the invention.

In addition, according to the above-mentioned second exemplary embodiment of the invention, the required length of the feed line, while taking into account an elasticity of extension, as well as the arrangement and the fastening of the feed line on the vehicle parts are constructed such that the feed line can adapt itself to a plurality of conceivable movements of the acceleration sensor and changes of the feed line duct caused by the deformation of vehicle parts, particularly all movements resulting from an impact of the motor vehicle of low or medium severity within the minimum reaction time period, and changes of the feed line duct, without tearing off or being damaged.

Similar to the above-mentioned deformation space, the dimensions and the precise shape of the feed line duct to be provided are defined by the range of the impact velocities to be detected by the acceleration sensor, using the minimum reaction time, using the structural stiffnesses of the vehicle parts forming the feed line duct as well as using the structure of the vehicle parts situated between the feed line duct and a potential impact site on the vehicle. If information is available for this purpose, as in the case of the dimensioning of the deformation space, the mass, the shape, the stiffness, the velocity and additional physical quantities of impacting objects can also be taken into account during the assessment. In principle, the dimensioning of the feed line duct can take place on the basis of limit value estimates and/or computations and/or simulations such as FEM.

Because of the exposed mounting on the outer vehicle circumferences implied therein, the above-mentioned advantages of a system according to the invention are bought by the necessity of a robust construction of the acceleration sensors and their feed lines with respect to environmental influences, particularly moisture.

In contrast to most acceleration sensors used according to the state of the art, the housing of an acceleration sensor used in a system according to the invention includes a moisture-resistant construction. Likewise, the connection site between the housing and the feed line of the acceleration sensor has a moisture-resistant construction.

The use of a hydrolytically stabilized material for the housing of an acceleration sensor used in a system according to the invention is particularly advantageous in the embodiments according to the invention.

A particularly high resistance to moisture can be achieved if, as an alternative or in addition, the housing of the acceleration sensors is laser welded, particularly if it has a laser-welded lid.

Devices for a pressure compensation are provided on the housing of an acceleration sensor used in another particularly preferred exemplary embodiment of a system according to the invention. By using a pressure compensation, it can be prevented that, as a result of a vacuum in the housing interior, moisture is sucked into the housing interior.

In addition to the resistance to moisture, when constructing the acceleration sensors and feed lines, because of their exposed mounting in the vehicle, a high robustness with respect to mechanical damage such as bursting of the sensor housing, tearing off or breaking of the feed line has to be ensured. However, by advanced techniques in the manufacturing of acceleration sensors and feed lines, the above-mentioned demands can be met.

The moisture-resistant housings for the exemplary acceleration sensors used according to the invention have a high elasticity. Elastic materials are less susceptible to destruction than the materials used in the systems according to the state of the art in the case of a deformation-caused contact with vehicle parts, which ideally is to be avoided, and/or in the case of a deformation of the vehicle part on which the acceleration sensor is mounted. According to the state of the art, acceleration sensors are, for example, mostly accommodated in metal housings with a glued-on lid. When elastic housings of the acceleration sensors are used, vibrations of the vehicle part on which the acceleration sensor is mounted cause lower interference signals than when stiffer housings, such as metal housings, are used.

In addition to the use of flexible and ideally also elastically extensible materials for the feed lines, the mechanical securing of the feed lines predominantly already takes place in the early development process of a vehicle.

In the previous consideration, it was assumed that the acceleration acting upon an acceleration sensor mounted on the outer vehicle circumferences largely corresponds to the acceleration of the surrounding vehicle parts, and the output signals of the acceleration sensor therefore supply a good representation of the acceleration acting upon the corresponding vehicle parts.

In the case of the use of acceleration sensors with a preferred effective direction, an assessment of the type and severity of an impact based on this prerequisite can, however, reliably take place only if the acceleration sensor is mounted on the outer vehicle circumferences such that, in the event of an impact, they are not rotated out of their preferred effective direction. For an optimal receiving of signals by the acceleration sensors, care should therefore be taken that the acceleration caused by an impact and acting upon the acceleration sensor has a high translatory component and a rotatory component which is as low as possible.

In order to ensure a predominantly translatory acceleration in the event of an impact, it is particularly advantageous for the cross-section of the acceleration sensor to overlap in the direction of the vehicle interior essentially with the cross-section of a supporting element on the vehicle part carrying the acceleration sensor. If, for constructive reasons, an overlapping is not possible, a distance that is as small as possible (for example, less than 10 cm) is desirable.

According to a preferred exemplary embodiment of the invention, an acceleration sensor used in a system according to the invention is therefore positioned such that the cross-section of the acceleration sensor in the direction of the vehicle interior, is at a narrow distance from the cross-section of a supporting element, such as an impact absorber.

If permitted by the constructive marginal conditions, an acceleration sensor according to a particularly preferred embodiment of the invention is positioned such that its cross-section in the direction of the vehicle interior substantially overlaps with the cross-section of a supporting element.

If, on the other hand, acceleration sensors are used which are capable of detecting by measuring techniques accelerations in several directions and/or a rotation, particularly about the own vertical axis, a rotation of an acceleration sensor must not necessarily be avoided by constructive measures, but can be taken into account mathematically when analyzing its output signals.

The output signals of the acceleration sensors are transmitted to a control unit by way of feed lines. The control unit is suitable of determining the type and severity of an impact, for example, by comparing of the recorded value-continuous acceleration signals with stored reference data. In particular, the control unit of an advantageous device according to the invention is suitable for differentiating using the output signals of the acceleration sensors between an impact of the vehicle and disturbing influences which are not relevant to safety.

As a function of the type and severity of an impact, the control unit triggers suitable safety measures. The triggering of suitable safety measures may also comprise the triggering of preparatory measures which have the effect that one or more safety measures triggered later take place in an improved, for example, faster manner.

Other objects, advantages and novel features of the present invention will become apparent from the following detailed description of the invention when considered in conjunction with the accompanying drawings.

BRIEF DESCRIPTION OF THE DRAWINGS

The invention will be explained in detail in the following with reference to the attached drawings.

DETAILED DESCRIPTION OF THE DRAWINGS

Figure 1:
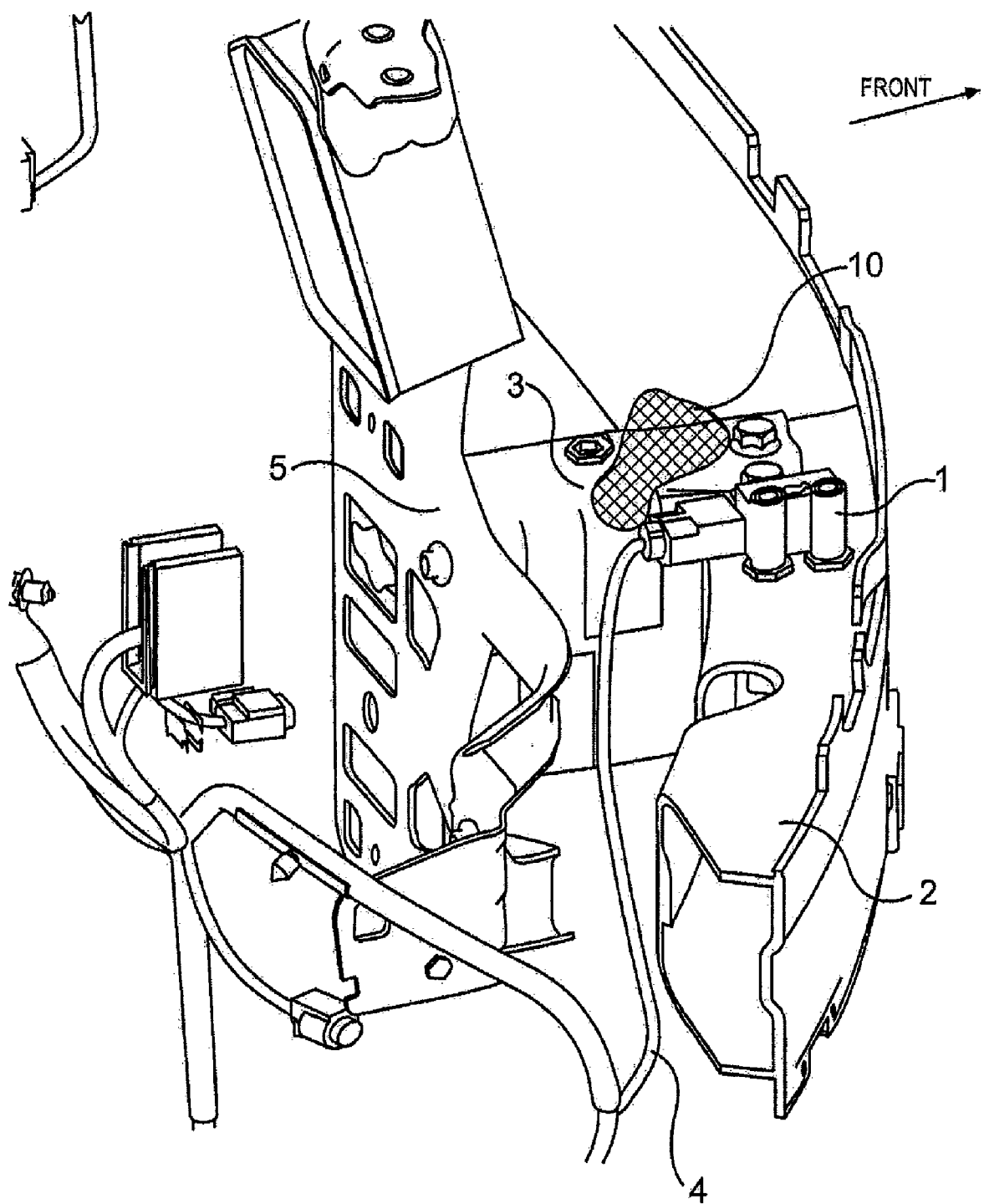
FIG. 1 is a schematic view of the mounting of an acceleration sensor as a front sensor in a passive occupant safety system for a motor vehicle, according to an exemplary embodiment of the present invention.

FIG. 1 is a schematic view of the mounting of an acceleration sensor as a front sensor in a passive occupant safety system for a motor vehicle according to an exemplary embodiment of the present invention. In this embodiment, the acceleration sensor 1 operating as a front sensor is fixed directly on the bumper 2. The acceleration sensor is thereby situated in the direct proximity of the outer vehicle circumferences.

The system according to the invention is used particularly for the detection and differentiation of impacts of low or medium severity, so-called "low-speed" crashes at relative impact velocities of up to 40 km/h against a soft object, or relative impact velocities of up to 30 km/h against a hard object. The acceleration signals measured in the process are usually in the value range of below 50 times the gravitational acceleration. Investigations have demonstrated that "high-speed" crashes at other measuring sites, for example, in the vehicle center, can be detected earlier and more reliably.

The exemplary system according to the invention may be provided completely separately from a system for the detection and differentiation of "high-speed" crashes or may utilize certain components together with such a system.

As a result of the low structural stiffness of the bumper 2, the acceleration sensor 1 is exposed to lower vibrations than, for example, in the case of a mounting on a vehicle body part 5 distinguished by a higher structural stiffness.

At the illustrated mounting site, the acceleration sensor 1 is protected by the outer vehicle shell largely from outer environmental influences, such as direct impacts, weather, splashing water, and others. Additional robustness is provided to the acceleration sensor 1 by a moisture-resistant and elastically constructed housing made, for example, of a hydrolytically stabilized material with a laser-welded lid.

On the side of the acceleration sensor 1 facing the vehicle interior, a deformation space is constructed. Toward the vehicle exterior, the deformation space is bounded by a conical hyperplane which may set an opening angle of about +/−15 degrees around a space vector pointing toward the vehicle interior as a result of the acceleration sensor situated in its starting position. The hyperplane is selected such that, before, during and after a deformation caused by an impact, the acceleration sensor 1 is situated with a high probability completely on the side of the hyperplane pointing to the vehicle interior. Toward the vehicle interior, the deformation space is substantially bounded by the vehicle body part 5. Additional vehicle parts not shown here may further bound the deformation space, for example, in the upward direction.

The volume of the deformation space, particularly its depth, which is enlarged in comparison to the state of the art in which such a deformation space was not provided in a targeted manner, thus essentially the distance between the mounting site of the acceleration sensor 1 and the next vehicle body part 5 situated behind it, in the event of a impact, results in a correspondingly prolonged time period between the first measurable acceleration of the front sensor and its contact with the vehicle body, by which the acceleration sensor 1 can potentially be mechanically damaged. The reaction time period of the acceleration sensor 1 is thereby prolonged in comparison to the state of the art.

In the exemplary embodiment illustrated in FIG. 1, the deformation space is hollow. As an alternative, a deformation space according to the invention may contain vehicle parts 10 which all have such a low structural stiffness that the acceleration sensor 1 secured by this deformation space is not damaged by these vehicle parts after a deformation of the surrounding vehicle parts following an impact.

In the present case, the deformation space or the vehicle parts defining this deformation space are constructed such that, after an impact of the motor vehicle of low or medium severity, the acceleration sensor 1 does not come in contact with a vehicle part of high structural stiffness, particularly the vehicle body part 5, within a minimum reaction time period of about 40 ms. The acceleration sensor 1 is therefore not destroyed within the minimum reaction time period of about 40 ms and remains fully operable.

The reaction time period of an acceleration sensor is the time period between an impact to be detected and the failure or the destruction of the acceleration sensor. The reaction time period can already be determined in an early development phase by data models—so-called virtual prototypes—by FEM simulations for different mounting sites of an acceleration sensor, for different impact situations and different embodiments of the deformation space and can be compared with the desired minimum reaction time period of about 40 ms.

A plurality of acceleration sensors are provided in the vehicle for detecting the acceleration caused by an impact of the motor vehicle at different sites of the motor vehicle. At least one of these acceleration sensors is arranged and secured according to the above description. The acceleration sensors are connected with a control unit by way of feed lines assigned to the acceleration sensors. Through the feed lines, the output signals of the acceleration sensors are transmitted to the control unit. The control unit analyzes value-continuous output signals at least of some of the acceleration sensors, determines the type and/or severity of an impact from the output signals and, as a function thereof, triggers suitable safety measures.

The cross-section of the acceleration sensor 1 in the direction of the vehicle interior, in the exemplary embodiment according to FIG. 1, only has a distance of a few centimeters from the cross-section of the impact damper 3. In the event of an impact and a deformation of the bumper 2, the acceleration sensor 1 is hardly rotated out of its effective direction pointing to the vehicle interior.

According to particularly advantageous exemplary embodiments of the invention, the acceleration sensor 1 is positioned such that the cross-section of the acceleration sensor 1 in the direction of the vehicle interior completely or partially overlaps the cross-section of the impact damper 3.

Since it can be ensured as a result of the described constructive measures that, in the event of an impact, the acceleration sensor 1 is not significantly rotated out of its effective direction oriented toward the vehicle interior, in the present embodiment, an acceleration sensor can be used which has a single preferred effective direction.

In other exemplary alternative embodiments of the invention acceleration sensors are used which are suitable for detecting by measuring techniques accelerations in several directions and/or or a rotation, particularly about the own vertical axis. When such acceleration sensors are used, their rotation can be taken into account mathematically when analyzing the output signals.

In addition to the above-explained mechanical securing of the acceleration sensors, the exposed mounting of the front sensors operating as acceleration sensors according to the invention requires also a separate mechanical securing of the feed lines of the front sensors.

For this purpose, the feed lines of the acceleration sensors have an elastic, particularly flexible construction. In addition, for protecting the feed line 4 of an acceleration sensor 1 from FIG. 1 within a minimum reaction time period after an impact against mechanical damage, a feed line duct is provided, the feed line 4 extending through this feed line duct.

The exemplary feed line duct is bounded by the surrounding vehicle parts, its geometry is therefore defined by the shape and the arrangement of these vehicle parts. The deformation of the vehicle parts therefore may also change the geometry of the feed line duct. In the example according to FIG. 1, the shape, the arrangement and the material of all vehicle parts are designed such that the smallest diameter of the feed line duct after an impact of the motor vehicle of low or medium severity, within a minimum reaction time period, remains larger than the diameter of the feed line, which in this example has a circular cross-section. The length of the feed line, as required, while taking into account an elasticity of extension of the feed line, as well as the arrangement and the fastening of the feed line on the surrounding vehicle parts are designed such that the feed line can adapt itself to a plurality of possible movements of the acceleration sensor and changes of the feed line duct caused by the deformation of vehicle parts, without tearing off or being damaged. In order to guarantee the minimum reaction time, the above-mentioned components in the example are constructed such that the feed line can adapt itself to all movements of the acceleration sensor and changes of the feed line duct resulting from an impact of the motor vehicle of a lower or medium severity within a minimum reaction time period, without being torn off, excessively bent or cut.

Under the conditions of modern development and manufacturing methods of the automobile industry, feed line ducts can be formed or created already in an early development process of a vehicle, which feed line ducts permit the described mechanical protection of the feed lines. The correspondingly required feed line lengths and thicknesses, the feed line holding devices and possible passages through vehicle parts can therefore already be provided or dimensioned in an early planning stage and can be implemented in the manufacturing process with a slight increase of the manufacturing expenditures. The verification as to whether a certain construction of the respective vehicle parts guarantees the desired minimum reaction time or the latter can be expected with a high probability takes place by simulation during the verification of the deformation space, for example, on the basis of an FEM analysis.

The availability of output signals of the acceleration sensors during the entire minimum reaction time period achievable by the system according to the invention guarantees the possibility of a precise and reliable assessment of the type and severity of an impact by the control unit.

In addition, as a result of the mounting sites closer to the outer vehicle circumferences than in the state of the art, an acceleration can be measured at an earlier point in time, whereby passive safety measures of the motor vehicle can also be activated or readied at an earlier point in time.

Figure 2:
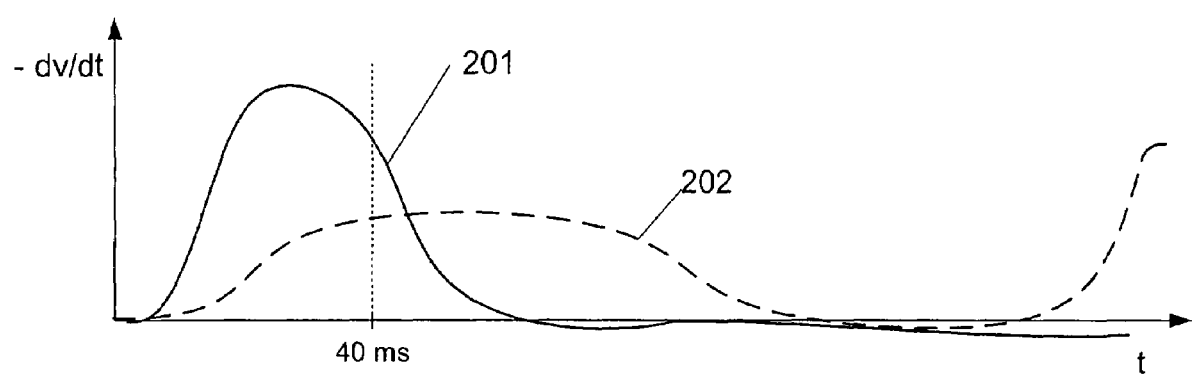
FIG. 2 is a diagram showing a comparison between the qualitative time behaviors of the negative acceleration which, during a frontal impact of a motor vehicle, acts upon an exemplary acceleration sensors arranged as a front sensor according to the invention, and upon an acceleration sensor arranged as a front sensor according to the state of the art.

For clarifying the above-described characteristics, FIG. 2 illustrates a comparison of the qualitative time behaviors of the negative acceleration which, during a frontal impact of a motor vehicle at the point in time t=0 ms, acts upon an acceleration sensor arranged according to the invention (signal 201) as a front sensor and an acceleration sensor arranged according to the state of the art (signal 202).

In the event of an impact, first a relatively low negative acceleration acts upon an acceleration sensor mounted on a vehicle body part according to the state of the art (signal 202), while flexible vehicle parts at the outer vehicle circumferences are already deformed as a result of the impact. In this phase, the acceleration measurable by the acceleration sensor is essentially determined only by the acceleration acting upon the entire vehicle and possibly a slight deformation of the vehicle body part as a result of a mechanical coupling with vehicle parts situated farther on the outside. The amount of the negative acceleration clearly increases only at a relatively late point in time (in FIG. 2 at t>100 ms), if the vehicle body part, after an excessive deformation of the vehicle parts situated farther to the outside, is still more deformed.

In the case of the exemplary mounting (signal 201) according to the invention, a strong negative acceleration can be measured at a significantly earlier point in time, because the deformation of the vehicle parts at the outer vehicle circumferences is entered fully into the measurement of the acceleration sensor.

For the purpose of orientation, FIG. 2 also contains a marker which marks the end of the minimum reaction time period extending from t=0 ms to t=40 ms.

The exposed mounting of the front sensors according to the invention may have the result that accelerations act upon the front sensors which can be measured also in the case of outer influences which are not relevant to safety. In addition to the mechanical securing of the acceleration sensors and their feed line, a mounting according to the invention also requires a securing of the entire safety system against malfunctioning. According to an exemplary embodiment of the invention, this securing is achieved utilizing information technology.

Figure 3:
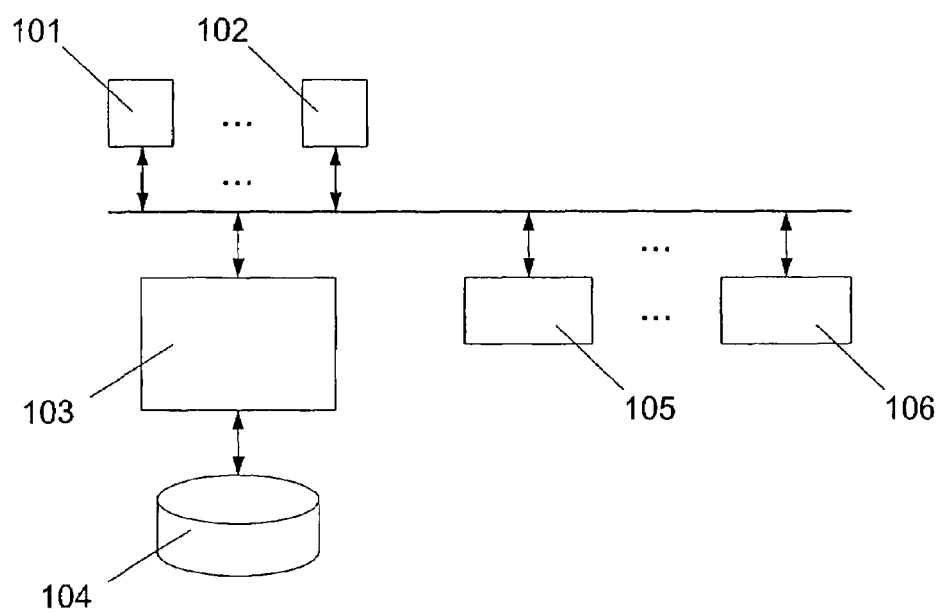
FIG. 3 is a schematic view of the communication structure of a passive occupant safety system according to an exemplary embodiment of invention for a motor vehicle.

FIG. 3 is a schematic view of the communication structure of an exemplary passive occupant safety system according to the invention for a motor vehicle. The acceleration sensors 101, 102 mounted in the vehicle in a distributed manner and used as front sensors communicate by way of a data bus with a central control unit 103. The control unit 103 analyzes the quasi-continuous time behaviors of the signals of the acceleration sensors 101, 102, compares them, as required, with different signal patterns filed in a database 104, determines the occurrence, type and severity of an impact and triggers corresponding passive safety measures. For this purpose, the control unit 103 communicates by way of the same or an additional data bus with control devices 105, 106 by which passive safety measures can be triggered.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for triggering passive occupant safety measures in a motor vehicle, comprising:
   a control unit;
   a plurality of acceleration sensors for detecting an acceleration caused by an impact of the motor vehicle at different locations of the motor vehicle;
   feed lines assigned to the plurality of acceleration sensors, adapted to transmit output signals of the acceleration sensors to the control unit;
   wherein the control unit analyzes value-continuous output signals at least of some of the plurality of acceleration sensors, determines a type and severity of the impact therefrom, and triggers appropriate safety measures;
   and wherein at least one of the plurality of acceleration sensors is mounted on a vehicle part of a low structural stiffness on an outer vehicle circumference, all vehicle parts of high structural stiffness being of a shape, arrangement and material to define a deformation space inward from the acceleration sensor, the deformation space having dimensions selected, based on a stiffness of the vehicle part of a low structural stiffness, to prevent contact of the at least one acceleration sensor with the vehicle parts of high structural stiffness after an impact of a low or medium severity, defined by the vehicle having a relative maximum velocity of about 40 km/h against a soft object and about 30 km/h against a hard object, within a minimum reaction time period of about 40 milliseconds.

2. The system according to claim 1, further comprising a deformation space which is one of hollow and exclusively containing vehicle parts of a low structural stiffness, disposed on a side of a vehicle part facing a mounting surface of the at least one acceleration sensor.

3. The system according to claim 2, wherein, in the direction of the vehicle interior, the deformation space is bounded by a plane selected to maintain the at least one acceleration sensor on a vehicle interior side of the plane in the event of an impact.

4. The system according to claim 3, wherein the plane comprises an essentially conical hyperplane.

5. The system according to claim 1, wherein one of the feed lines of one of the plurality of acceleration sensors is flexible, in that the feed line extends along a feed line duct defined by a shape, arrangement and deformation of adjacent vehicle parts,
   and wherein shape, arrangement and material of all vehicle parts are designed such that a smallest diameter of the feed line duct after an impact of a low or medium severity within a minimum reaction time period remains larger than a diameter of the feed line, and further wherein
   a length of the feed line taking into account the elasticity of extension and the arrangement and fastening of the feed line on the vehicle parts is constructed such that the feed line is adaptable to a plurality of predictable movements of the acceleration sensor, and changes of the feed line duct due to deformation of vehicles parts, particularly movements of the acceleration sensor and changes of the feed line duct resulting from an impact of low or medium severity within a minimum reaction time period, without tearing off or being damaged.

6. The system according to claim 1, further comprising a housing of at least one of the plurality of acceleration sensors having a moisture-resistant construction.

7. The system according to claim 6, wherein the housing of the at least one acceleration sensor consists of a hydrolytically stabilized material.

8. The system according to claim 7, wherein the housing of the at least one acceleration sensor is laser-welded, comprising a laser-welded lid.

9. The system according to claim 6, further comprising a connection point between the housing and the feed line of the acceleration sensor having a moisture-resistant construction.

10. The system according to claim 6, further comprising devices for pressure compensation disposed on the housing of the at least one acceleration sensor.

11. The system according to claim 1, wherein the at least one acceleration sensor is positioned to place a cross-section of the acceleration sensor in a direction of a vehicle interior a narrow distance from a cross-section of a supporting element.

12. The system according to claim 1, wherein the at least one acceleration sensor is positioned to place a cross-section of the acceleration sensor in a direction of a vehicle interior substantially in contact with a cross-section of a supporting element.

13. The system according to claim 1, wherein the control unit differentiates between an impact of the vehicle and disturbing influences not relevant to safety based on the output signals of the acceleration sensors.

14. A safety system for a motor vehicle, comprising:
an outer circumference structure of the motor vehicle having low structural stiffness;
vehicle body parts adjacent to the outer circumference structure having a high structural stiffness;
an acceleration sensor for detecting an acceleration caused by an impact, disposed on the outer circumference structure of the motor vehicle; and
a control unit for analyzing output signals of the acceleration sensor to determine a type of impact therefrom, and trigger safety measures,
wherein the outer circumference structure and the vehicle body parts are adapted to define a deformation space inward from the acceleration sensor, the deformation space having dimensions selected, based on a stiffness of the outer circumference structure, to prevent contact of the acceleration sensor with the vehicle body parts after a low or medium severity impact, defined by the vehicle having a relative maximum velocity of about 40 km/h against a soft object and about 30 km/h against a hard object, for a minimum reaction time period of about 40 milliseconds.

15. The safety system according to claim 14, further comprising feed lines connecting the acceleration sensor to the control unit having a shape and sufficient flexibility to remain intact after the low or medium severity impact for the minimum reaction time period.

16. The safety system according to claim 14, wherein the outer circumference structure and the vehicle body parts cooperate to define a deformation space facing a vehicle interior from a mounting surface of the acceleration sensor.

17. The safety system according to claim 16, wherein the deformation space contains only low structural stiffness parts.

18. The safety system according to claim 16, wherein the deformation space is shaped as a substantially conical hyperplane.

19. The safety system according to claim 14, further comprising a moisture resistant housing of the acceleration sensor.

20. The safety system according to claim 14, wherein a cross section of the acceleration sensor towards a vehicle interior is positioned to substantially contact a cross section of a supporting element of the acceleration sensor.

* * * * *